United States Patent [19]

Kanzelberger

[11] 4,267,224

[45] May 12, 1981

[54] PLASTIC MATERIAL FOR SIMULATING ENGRAVED METAL PLATES

[75] Inventor: James C. Kanzelberger, Riverside, Ill.

[73] Assignee: Contemporary, Inc., River Forest, Ill.

[21] Appl. No.: 58,568

[22] Filed: Jul. 18, 1979

Related U.S. Application Data

[60] Continuation-in-part of Ser. No. 801,863, May 31, 1977, which is a division of Ser. No. 770,797, Feb. 22, 1977, Pat. No. 4,125,655, which is a continuation-in-part of Ser. No. 579,419, May 21, 1975, abandoned, which is a continuation-in-part of Ser. No. 454,166, Mar. 25, 1974, Pat. No. 3,940,864.

[51] Int. Cl.³ .................... B32B 7/02; B32B 27/06; B44C 1/24
[52] U.S. Cl. .................................. 428/216; 156/59; 156/219; 156/239; 156/240; 428/458; 428/463; 428/483; 428/913
[58] Field of Search ............... 428/216, 463, 483, 458, 428/913; 156/59, 219, 234, 235, 239, 240

[56] References Cited

U.S. PATENT DOCUMENTS

| | | | |
|---|---|---|---|
| 3,014,828 | 12/1961 | Reese | 156/240 |
| 3,480,500 | 11/1969 | Hotter | 156/240 |
| 3,510,388 | 5/1970 | Hunt et al. | 40/136 |
| 3,567,571 | 3/1971 | Martinovich | 156/240 |
| 3,666,516 | 5/1972 | Dunning | 428/913 |
| 3,681,180 | 8/1972 | Kent | 428/458 |
| 3,940,864 | 3/1976 | Kanzelberger | 428/483 |
| 3,953,635 | 4/1976 | Dunning | 156/239 |
| 4,084,032 | 4/1978 | Pasersky | 428/913 |
| 4,125,655 | 11/1978 | Kanzelberger | 156/235 |

*Primary Examiner*—William R. Dixon, Jr.
*Attorney, Agent, or Firm*—Laff, Whitesel & Rockman

[57] ABSTRACT

A plastic material which is suitable for simulating engraving on metal has a substrate which is not deformed by the heat or pressure of a hot stamping process. A sheet or layer of thermoplastic material of limited thickness is laminated to the upper surface of the substrate. The opposite side of the thermoplastic material is covered by a containment film. Thus, within the limits of manufacturing tolerances, the layer of thermoplastic material may be subjected to any amount of pressure to produce a debossment which is no deeper than the depth of the limited thickness when a hot stamping die bottoms on the non-deformable substrate. Therefore, there is a much more predictable end product.

13 Claims, 20 Drawing Figures

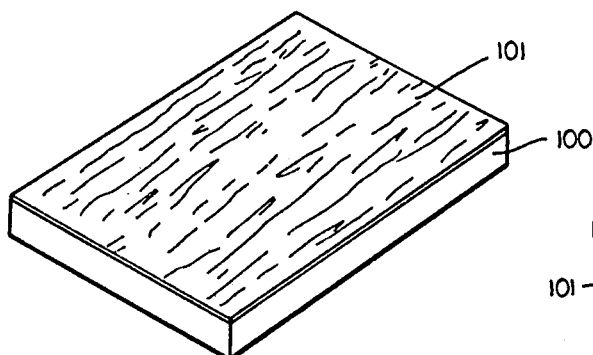
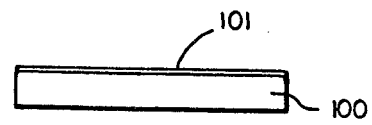
FIG.9
FIG.10
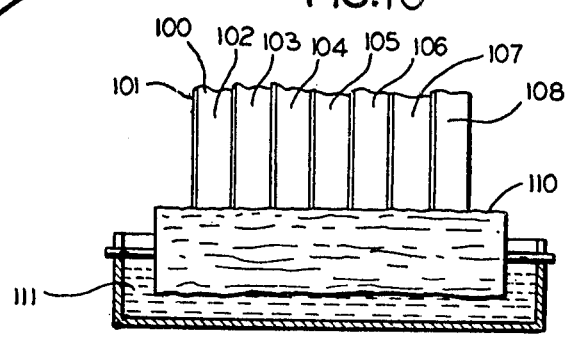
FIG.11
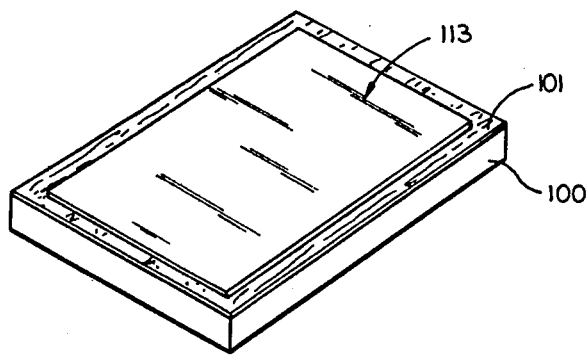
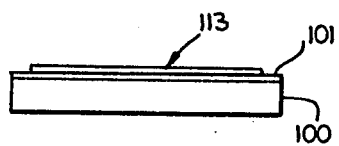
FIG.12
FIG.13
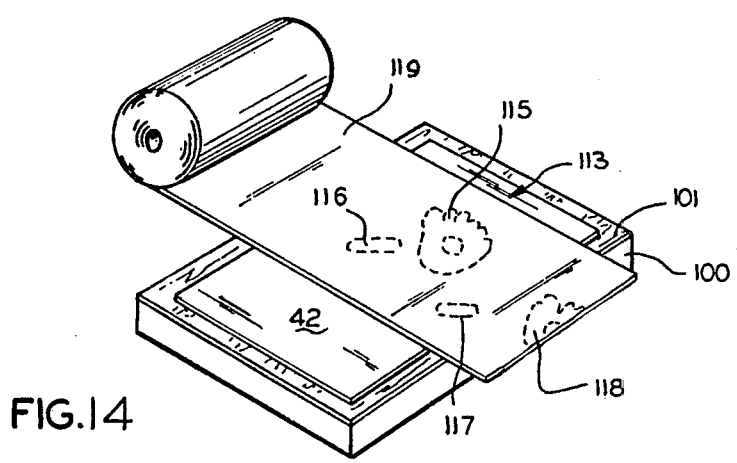
FIG.14

PLASTIC MATERIAL FOR SIMULATING ENGRAVED METAL PLATES

This is a continuation-in-part of my co-pending application Ser. No. 801,863, filed May 31, 1979, which was, in turn, a continuation-in-part of U.S. patent application Ser. No. 454,166, filed Mar. 25, 1974, now U.S. Pat. No. 3,940,864.

Thus, the present application is one of a series of sequentially co-pending applications relating to various aspects of the same plastic material which is suitable for simulating engraving on metal. The following cross-references to these applications and a claim to their co-pendency are made of record, as follows:

| S.N. | FILED | RELATIONSHIP OF APPLICATIONS | PRESENT STATUS |
|---|---|---|---|
| 454,166 | 3/25/74 | 1st Application | Pat. 3,940,864 March 2, 1976 |
| 574,414 | 5/21/75 | Continuation-in-Part of S.N. 454,166 | Abandoned May 6, 1977 |
| 613,545 | 9/15/75 | Division of S.N. 454,166 | Patent 4,047,996 Sept. 13, 1977 |
| 770,797 | 2/22/77 | Continuation-in-Part of S.N. 579,419 | Patent 4,125,655 Nov. 14, 1978 |
| 801,863 | 5/31/77 | Division of S.N. 770,797 | Pending |

This invention relates to plastic material which is suitable for simulating engraving on metal by imprinting by a hot stamping process, and to methods of using this material.

My above-identified parent applications described means for and method of making plastic plates which are hot-stamped and have the appearance of engraved metal plates. The basic structure is a laminate of plastic layers wherein a layer or plate of thermoplastic material is mounted on a substrate and covered with a thin containing film having a heat-resisting characteristic. The containing film has a decorative surface coating which simulates, for example, brushed brass, silver, or another metal. However, it is also possible that other attractive surface appearances could be used as, for example, the appearance of letters burned in wood.

In operation, a heated die is pressed against the decorative surface of the containing film with a force which is sufficient to heat, displace and deboss the thermosetting plastic. A hot stamping foil is positioned between the die and the film surface, thereby transferring ink from the stamping foil into the bottom of the debossment. Since the surface coating usually has the appearance of brushed brass, or another metal, the end result closely simulates an engraved metal plate. By multiple-stamping, many colors may be successively superimposed to provide special effects.

The end result of this invention has almost instantaneously enjoyed great commercial success. As a result, there was a need to reduce costs by mechanically performing some steps which had been an "art." Also, there was a need to provide a general purpose material which could be used in many different settings.

For example, the heated die is pressed into the surface covering over the thermoplastic material. If the die is pressed too far, there is a chance that the ink from the hot stamping foil might color the plate outside the area of the debossment. Also, too much displacement of thermoplastic material could occur, causing a distortion of the surface appearance. On the other hand, if the die is not pressed far enough into the thermoplastic material, the engravement might appear faulty.

In the material shown in my previous applications, it is relatively easy for an operator to learn how deeply the die must be pressed into the thermoplastic material, but use of farily expensive hand labor is required. An alternative method, which uses a control circuit to gauge how far to depress the die into the thermoplastic material, is also expensive.

The prior parent applications concentrated on the design of special products such as monogram plates, wall or award plagues, or the like. Each of these items has a specialized use. However, since the inventive material has rapidly become popular, people have found many uses which fit their own special needs, but which would not normally occur to others without that need. For example, some people have made plastic business cards which look like engraved metal plates. Thus, there is need for sheet stock of the plastic material which is suitable for simulating engraving on metal which may be sold for creation of a user's own special product.

Accordingly, an object of the invention is to provide new and improved plastic material which is suitable for simulating engraving on metal. Here, an object is to provide sheet stock for sale to people who use it to tailor-make their own products. Accordingly, an object is to reduce or eliminate the requirement for specially-skilled operators, and to reduce the process to simple and foolproof steps which may be successfully employed by first-time users of the material.

Another object is to produce uniform engravement, almost regardless of how forcefully the heated die is pressed into the thermoplastic material.

Yet another object is to more faithfully simulate metal engraving.

In keeping with an aspect of the invention, these and other objects are accomplished by limiting the thickness of the thermoplastic material to the desired depth of debossment. The thermoplastic material is laminated to a substrate which is not affected by heat. Therefore, it limits the travel of the heated die to precisely the desired depth of debossment. The substrate thickness is adequate to prevent distortion of the plastic material which is suitable for simulating engraving on metal, uncontrolled flow of thermoplastic material, or the like. Thus, the built-in substrate eliminates the dependence upon a special form of substrate heretofore provided by a release paper backing or a wooden plaque backing. Accordingly, the sheet stock may be adapted for many purposes, without regard to the need for a separate substrate backing.

BRIEF DESCRIPTION OF THE DRAWINGS

The invention may be understood more fully by reference to the drawings wherein:

FIG. 9 is a perspective view of a blank plaque having a wood grain surface;

FIG. 10 is an end view of the plaque of FIG. 9;

FIG. 11 is an end view of a plurality of blank plaques being edge-painted by a roller partially immersed in a vat of paint;

FIG. 12 is a perspective view of an edge-painted blank plaque having adherent thereon a plastic sheet with a metallic-appearing surface;

FIG. 13 is an end view of the plaque of FIG. 12;

FIG. 14 is a perspective view of a hot stamping process for applying a contrasting design over the metallic-appearing surface;

The following principles shown in FIGS. 1-7 and described herein were originally set forth in the above-identified patent application Ser. No. 454,166.

Figure 3:
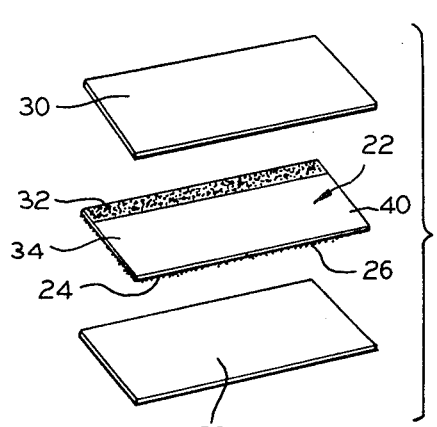
FIG. 3 is an exploded view of the layers of the article of FIG. 1.
Figure 1:
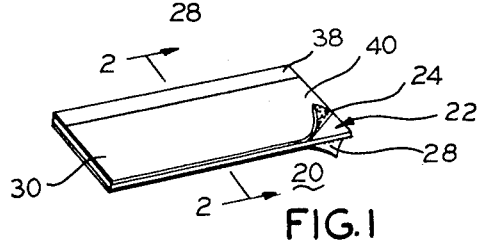
FIG. 1 is a perspective view of one embodiment of an article made according to this invention.
Figure 2:
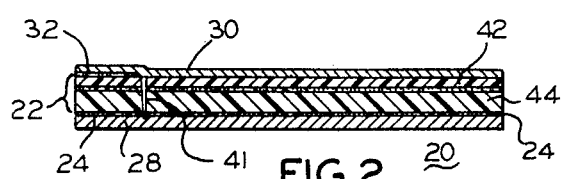
FIG. 2 is a cross-sectional view taken along line 2—2 of FIG. 1.

As illustrated in FIGS. 1-3, the article 20 comprises a plastic pad 22 of a preselected size and shape, preferably having a pressure-sensitive adhesive 24 on the back 26 of the pad 22. The adhesive coating 24 is covered by a backing sheet 28, which is chemically treated, such as by silicone or wax to provide a release surface.

A hot stamping foil 30 is superimposed over a plastic plate 40 forming a major part of the pad 22. A second adhesive coating 32 is located on an appendage 38 on the front 34 of the pad 22, to hold in place the hot stamping foil 30. Other suitable means, such as stapling, may also be employed for retaining the foil 30 on the pad. The appendage 38 is separated from the remainder or plate portion 40 by means of a slit 41. The backing sheet 28 maintains the appendage portion 38 in its original contiguous relationship with plate portion 40 so that the entire article 20 is a self-contained unit during the hot stamping operation.

Figure 4:
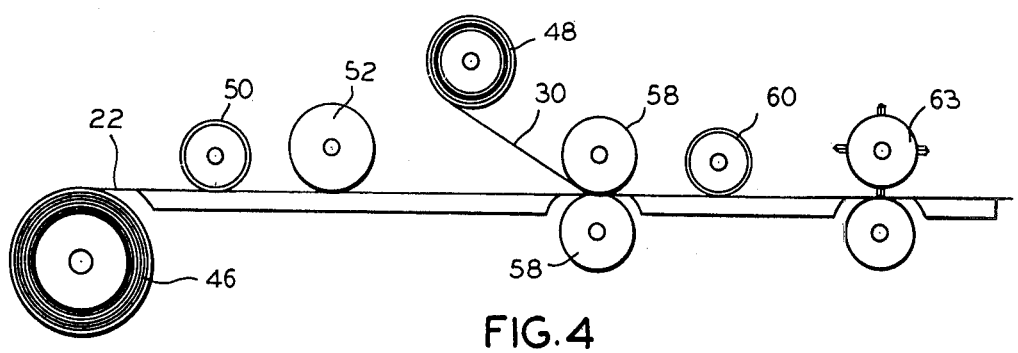
FIGS. 4 and 5 schematically illustrate an exemplary method and apparatus for manufacturing the article of FIG. 1.

The pad 22 comprises a polyester film 42 laminated on a thermoplastic material 44 (FIG. 4). Applicant has found "metallized" MYLAR to be a satisfactory polyester film (MYLAR is a trademark for polyester film of the DuPont Company). "Metallized" MYLAR which may have the aesthetic properties of gold or silver, for example, is readily available from various manufacturers, such as the Flexcon Company, Inc. One characteristic of MYLAR is that it has almost no heat-spreading capability. Therefore, the heat of the die does not spread out of the debossment area.

The thermoplastic material 44 should be readily formable through an application of moderate heat and pressure, and a pressure-sensitive adhesive should adhere to it. The material 44 should also be sufficiently rigid to function as a printable plate. Applicant has found rigid polyvinyl chloride to be satisfactory.

In one form, article 20 was constructed by using a pad 22 of MYLAR film with a thickness ranging from $\frac{1}{2}$ to 1 mil, and rigid vinyl with a thickness of about 8 mils. Within this range, applicant has found that the pad 72 is sufficiently rigid and thick to withstand hot stamping and to provide a suitable imprinting surface.

For the adhesive backing 24, a number of compositions can be used. These "pressure-sensitive adhesives" are various blends of natural and synthetic rubbers with resins, polyvinyl acetates, ethylene-polyvinyl acetate copolymers (EVA), polyterpenes, hydrogenerated resins, resin ester, acrylics, chlorinated paraffins, ethyl cellulose, and a variety of other substances. Common and well-known types of pressure-sensitive adhesives are exemplified by those used on transparent cellophane adhesive tapes. These materials may be applied as solutions using solvents such as naphthas, toluene, chlorinated hydrocarbons, and the like. An important property is that the adhesive is capable of adherence to metal, wood and other types of surfaces used for the products to which the plates of this invention are intended to be attached. The protective cover 28 may be paper, plastic, or other suitable material having desirable releasing properties.

The hot stamping foil 30 includes a carrier supporting a coloring matter such as ink. Generally, the carrier may be MYLAR, cellophane or acetate, or the like. The foil is available in many colors so that various degrees of contrast between the lettering and the remaining plate surface may be achieved. Distributors of suitable hot stamping foils include Howard Corp., Franklin Corp., and Kingsley Corp.

It should be noted that the rectangular shape of product 20 in this embodiment is merely an example, and the invention is not limited thereto.

Figure 5:
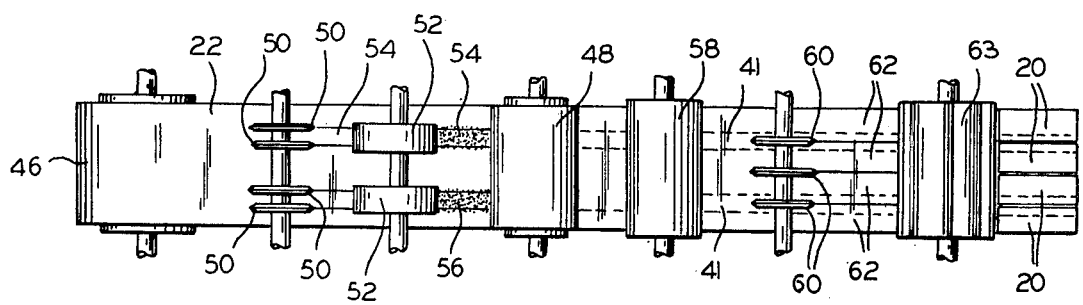
Figure 6:
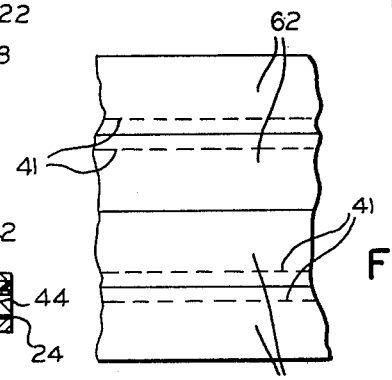
FIG. 6 is a fragmentary view of the article of FIG. 1, as it appears during the manufacturing process illustrated in FIGS. 4-5.

FIGS. 4-6 disclose an exemplary method of manufacture which may be used to produce the article of this invention. The method illustrated may be performed on a Webtron Printing Machine.

In the preferred embodiment, the pad 22 having adhesive 24 on one side, which is protected by the backing paper 28, is first manufactured in any convenient manner and rolled into a supply roll 46. Likewise, the hot stamping foil 30 is manufactured in any conventional manner and rolled into supply roll 48.

In one form, the width of the material 22,30 on each of the supply rolls 46,48, respectively, is $4\frac{1}{2}$ inches. This material is slit into four ribbons or strips 62 which are $1\frac{1}{8}$" wide. Each strip 62 includes plate material 40 which is $\frac{7}{8}$" wide and appendage material 38 which is $\frac{1}{4}$" wide. The finished product 20 is thus $1\frac{1}{8}$" wide, and the imprinted plate is $\frac{7}{8}$" wide.

The plastic laminate web 22 is drawn from supply roll 46 under slitters 50 which cut only through the pad 22. The backing paper 28 is not cut; it remains intact. Next, adhesive impregnated rollers 52 apply adhesive between the cut or slitted areas 54,56. The supply roll 48 of hot stamping foil 30 is drawn into contact with the adhesive-coated laminated material 22. Pressure roll 58 aids in assuring adhesion of hot stamping foil 30 to the slitted areas 54 and 56 of the plastic laminate 22.

Cutting wheel 60 longitudinally divides the web into the four strips 62. Transverse cutting wheel 63 divides the strips 62 into the completed articles 20. It should be noted that the rectangular article 20 could be die cut into other desired shapes by suitable die-cutting apparatus (not shown).

Figure 7:
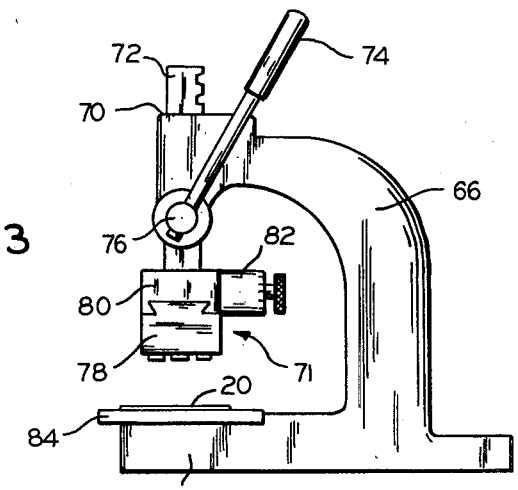
FIG. 7 is a side view of a hot stamping machine capable of imprinting the article of FIG. 1.

The article 20 may be hot-stamped on a conventional hot stamping machine 69, as illustrated in FIG. 7. The machine 69 comprises support member 66 suitably mounted on base member 88. The upper portion of the support member 88 has a ram-receiving aperture 70. Stamping means 71 includes a spring-biased ram 77 slidably mounted within ram-receiving aperture 70 and articulated by handle 74 through gear means 76. A heat conductive-type stick 78, containing preselected type, is mounted on a heat conductive mandril portion 80 of ram 72. A heating means 82 supplies thermal energy to the type stick 78.

After the type has been set and the type stick 78 has been inserted into the mandril portion 80, the article 20 is aligned by suitable means on base plate 84. Responsive to the activation of handle 74, stamping means 71 is forced downwardly onto article 20 and heat is concurrently applied, thereby debossing the article 20 while transferring ink from the hot stamp foil to the debossed letters. The temperature and time at which the stamping operation is carried out are related functions. If the temperature is increased, the time of contact between the stamping means and the object being stamped may be decreased or increased. It has been found that a hot stamp temperature range of between 150° and 300° will give satisfactory debossing results. At these temperatures, the time range may vary from a fraction of a second to three seconds. At a temperature of 250° F., a stamping time of between one and one-and-one-half seconds is satisfactory. The hot stamping foil 30 selected for this process should accommodate the temperatures used and the materials being stamped.

The film 42 is a heat-insulating covering film which withstands the hot stamping temperature, without acting as a heat conductor to spread the stamping heat across the upper surface. The covering film contains and follows the thermoplastic material as it debosses to form an imprintable surface.

A further function of the stamping operation is to apply pressure to the stamping means. In hand-operated stamping equipment, normal hot stamping pressures may be satisfactorily applied. One feature of the embodiment of FIG. 7 is that it allows correction where too little or too much pressure has been applied to the plate being imprinted. If the operator exceeds the proper pressure or stamping time, either a conventional burnishing stick or a cleaning fluid may be rubbed over the surface of the plate to remove excess ink. If the operator uses too little pressure or time, the plate may be restamped. Thus, the process of FIG. 7 tends to become an "art" wherein the operator tends to have to learn how to stamp the pad.

Once the article 20 has been hot-stamped, the backing sheet 28 is removed and the plate portion 40 is separated from appendage portion 38 and foil 30 (as best illustrated in FIG. 3). The plate portion 40 may then be applied to a plaque or other object.

In the embodiment of FIGS. 1–3, the backing paper 28 is a substrate which keeps the thermoplastic plate from being distorted responsive to an application of heat and pressure, during the hot stamping process. Other embodiments in the above-identified parent applications used a wooden plaque as the stabilizing substrate. A difficulty with these substrates was that they led directly to specialized products which required backing paper, plaque board, or the like. Not all products will require these particular substrates. Moreover, the thermoplastic plate 44 of FIG. 2 is very thick relative to the depth of the debossment. Therefore, as explained above, if too much pressure is applied, the hot stamping ink is deposited onto the non-debossed areas. If too little pressure is applied, the printing is not crisp and sharp.

According to the invention, both of these drawbacks are overcome by the structure shown in FIG. 8, wherein a substrate is built into the plastic material which is suitable for simulating engraving on metal itself, as distinguished from a separate substrate integrally laminated below the plastic material which is suitable for simulating engraving on metal.

Figure 8:
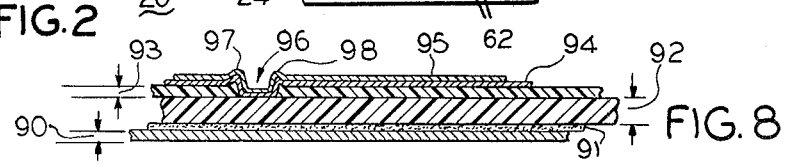
FIG. 8 is a cross-sectional view of the new and improved material which accomplishes the above-stated and other objects.
Figure 15:
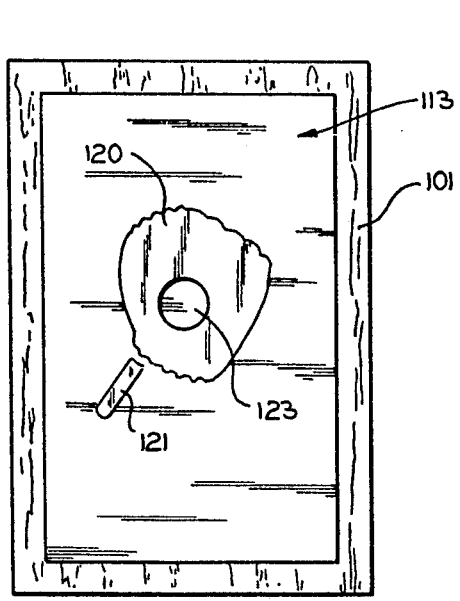
FIG. 15 is a plan view of the plaque after completion of the step of FIG. 14.

In greater detail, the laminate of FIG. 8 includes a release paper 90 having a treated, plasticized, non-hydroscopic surface which peels off a layer of adhesive 91. Above the adhesive is a substrate layer 92 of material which withstands and does not deform under the pressure or heat of a hot stamping process.

In one preferred embodiment, the substrate 92 is MYLAR film which is 0.005 inches thick.

Other embodiments may use many different forms of substrates. For example, various forms of metal may be used as the substrate 90. One such metal, which is easily available, is commonly called "engraving stock," which is the conventional material that the invention replaces. Other such metals may include any of many different sheet metals, such as: aluminum, steel, and various alloys.

If these substrate materials have any surface texture, that texture appears on the surface of the inventive material. Therefore, it is possible to enhance the surface appearance of the inventive material by selecting a substrate with a particular texture. On the other hand, it is also desirable to have a substrate which is extremely smooth and free of any texture. One such material is currently used to make the walls of beverage cans because that metal is smooth enough to print labels, pictures, etc. directly on them, with conventional printing equipment. The walls of these beverage cans are also quite thin so that they are easily worked. For example, when this kind of metal is used as a substrate, the inventive material is easily stamped with a sheet metal stamping machine after the surface has been decorated with hot stamp engraving.

Hence, the substrate is not necessarily limited to any particular kind of material, either metal or plastic. It should be selected on a basis of rigidity, pliability, mass, formability, and compatibility with existing machinery.

Above the substrate 92, there is a layer 93 of thermoplastic material, which is a 0.004 inches thick layer of the vinyl used in the above-described embodiment of FIG. 2. Covering the upper surface of the thermoplastic layer 93 is a thin sheet or containment layer 94 of material which does not spread heat. Layer 94 contains and follows the flow of the thermoplastic material during debossment. In the preferred embodiment, this material 93 is MYLAR film, which may be 0.001 inches thick. Finally, a decorative color coating layer 95 coats the containment layer 94. If the MYLAR film 94 is metalized at 95 by aluminum, which is deposited in a thickness of a few molecules, the film will have the metallic appearance of silver or aluminum. Likewise, if the coating layer 95 is the color of copper, brass or gold, the metalized film 94 will appear to be copper, brass or gold, respectively. In the embodiment described herein, the coloring layer 95 may be 0.001 inches thick.

As seen at 96 in FIG. 8, the heated die may be lowered until it bottoms on the top of the MYLAR substrate 92. Since the substrate is a material which does not deform under heat, the die cannot penetrate any further than the thickness of the material 93. Thus, within reason, it is almost irrelevant how much pressure is applied to the engraving material during the hot stamping process.

If a cross section of an engraved metal material is examined under a microscope, it is found that a small rim is generally pushed up around the perimeter of the image pressed into the metal. In the embodiment of FIG. 2, there is enough thickness in layer 44 so that the thermoplastic material may be displaced in many directions. Therefore, the raised rim may or may not form, depending upon many random variables, and it may or may not be a faithful simulation of debossed metal.

However, the inventive material of FIG. 8 does not have enough thickness in the layer 93 to absorb a substantial amount of plastic displacement. Therefore, some of the plastic material, displaced by the die will almost certainly flow upwardly to form the rim at 97,98. The amount of the material displaced around the rim has to be greatly exaggerated in FIG. 8 in order to produce a drawing which can be seen and read easily. In reality, the rim is apparent only as subtle highlights and shadows formed around the perimeter of a debossment.

By controlling the thicknesses of the various layers 92-95, these highlights and shadows may be made to closely simulate debossed metal whereas, in the order version of FIG. 2, it was easy to produce either too much or too little of these highlights and shadows, if a rim was produced at all.

Principles described in connection with the embodiments of FIGS. 1-8 are employed in the inventive plaque, and in the process for fabricating it. The plaque and process are described in FIGS. 9-20. Among other things, the inventive process includes the use of a hot stamping machine, such as that shown in FIG. 7, and the product includes a laminate of polyester film on a thermoplastic material.

The invention has a wide application in many fields. For example, jewel boxes, cabinets, doors, picture frames, product housings, dashboards, trays, and many other things may be made by the described processes. Accordingly, as used herein, the term "plaque" is to be construed to cover all devices which may incorporate the designs, features and processes described herein.

The first step in the process for making the inventive decorative or award plaque or other panel is to cover the surface of a rigid board 100 with a finish coat 101 having any suitable surface. While any of many different suitable materials may be used to make the plaque blank of FIG. 9, it is presently thought that a wood grain vinyl sheet 101 bonded to a flake board panel 100 is the best material. Any of various plaque sizes and shapes may be used, one exemplary plaque being 4"×6"×0.5" (10×15×1.3 centimeters).

After a suitable number of plaque blanks (FIGS. 9,10) are cut to size, their edges are finished in any suitable manner. For example, plaque blanks 102-108 are shown in FIG. 11 as being clamped together and passed over a roller 110 which is at least particularly submerged in any suitable paint or similar material 111. Thus, the edges of boards 107-108 are filled and painted or otherwise given an attractive end-product finish.

Next, a laminated sheet of plastic material 113 is bonded to the wood grain vinyl 101. This sheet 113 is essentially the same film-covered plastic material described above in connection with FIG. 8. If desired, the plastic material may have a brushed golded metallic appearance. Thereafter, an ink (perhaps silver) on a hot stamping foil 119 is placed over, transferred and bonded to the metallic-like film surface 42, by a heating process. For example, in this particular drawing, the ink of a silver hot stamping foil 119 is transferred in the general form of a baseball catcher's mitt 115 and the tape 116 on a baseball bat handle. The outline 117,118 of silver ink already removed from the foil 114 indicates that a previous plaque was stamped with the same general form. The next plaque to be made will receive a transfer of silver ink presently carried in the area 119 of the hot stamping foil (FIG. 14).

After the first hot stamping ink transfer step (FIG. 15) is complete, the appearance is a brushed gold surface 113 having polished silver surfaces at 120,121. In this particular example, a brushed gold disc or circle 123 remains where no heat transfer occurred in the center of the silver patch 120.

Figure 16:
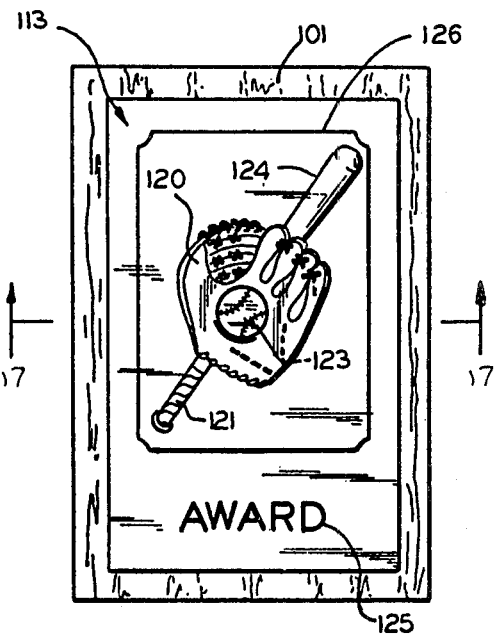
FIG. 16 is a similar plan view after completion of a debossing process explained by FIGS. 1-7.

The next step in the inventive process is to deboss the plaque of FIG. 16 and to deposit a colored ink in the debossments. Here, in this specific example, a number of black lines 124 are debossed to provide the details of a catcher's mitt, a baseball bat, and a baseball. If desired, still more details could be added. For example, the baseball could be made white and its stitching could be debossed red lines. Obviously, the ultimate number of steps is limited only by the imagination, the desired design, and the acceptable limits of costs.

Simultaneously, with the formation of the debossed lines 124, any suitable printing 125 may be formed. This printing could include a logo, a year, a person's name, or any other suitable message, such as, for example, "First Place." Likewise, any other suitable forms and styles of printing may be used.

The images 120,121,124 may be formed by any suitable die, such as a low-cost zinc die made by a photographic etching process, which is well-known in the printing art. For use at the point of sale, dies with any of many different standard logos may be ordered, at the retailer's option. For example, the retailer may buy a Little League Baseball motif, as shown in FIG. 16. He may also buy patriotic, religious, civic, fraternal or organization symbols. Company logos, product symbols and words could be combined for a salesman's award. Many different one-of-a-kind plaques may be made in a low-cost manner from stock dies. Of course, any desired special die may also be made. The plaque may be further personalized by setting type for the debossment, at 125, with individually selected messages.

Since the plastic 44 flows under heat, it may be heated and extruded once and then, within reason, reheated and re-extruded in a different manner. Also, the ink which is deposited in one step may be covered by other ink in a later step. Therefore, further customization may be achieved by overprinting. Thus, for example, religious symbols may be printed over a corner of an earlier printed flag, and then a motto may be printed over both the religious symbol and the flag. In a similar manner, many other combinations and modifications may also be made to customize decorative and award plaques.

Figure 17:
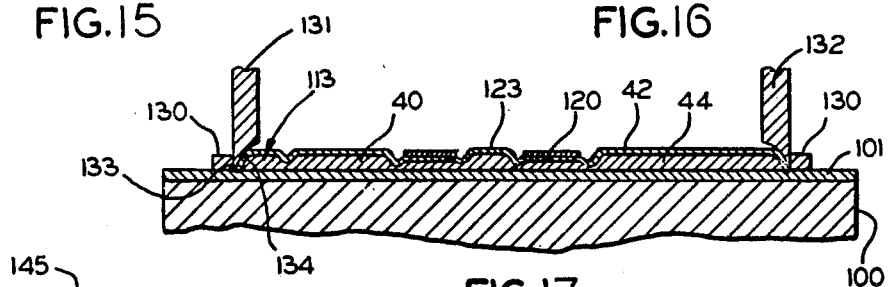
FIG. 17 is a cross-sectional view taken along line 17—17 of FIG. 16 and symbolically showing a die-cutting technique.

The next step of the process is to trim the surface layer 113 to the desired size and shape, and to remove the resulting selvage 130, as shown in FIG. 17. As illustrated, a die (preferably a steel rule die) 131,132 has blades which are sharpened on only one side to provide a straight edge 133 on the selvage side and a contoured edge 134 on the plaque side. If the contours were to be reversed with the straight edge on the plaque side, the plastic sheet 113 would be cut with a perpendicular edge 140 which might be caught and lifted by a fingernail. Also, the laminated nature of the plastic 44 and film 42 is exposed to view at the vertical edge 140, and have an effect upon the illusion of a metal plate.

Figure 19:
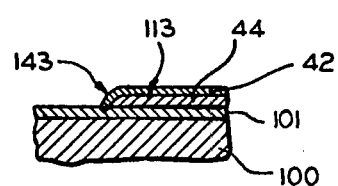
FIG. 19 is a fragmentary sectional view similar to FIG. 18, showing how the plaque is cut by the inventive process of FIG. 17.

To provide metallic-appearing edge contours which cannot be caught by the fingernail, the straight side 133 of the die edge faces the selvage 130, as shown in FIG. 17. Then, the tip of the die edge cuts the surface film 42, the trailing die contour 134 rolls the underlying plastic 44 so that it becomes somewhat rounded. As the tip of the die penetrates and slits the wood grain vinyl 101, the metallic-appearing film 42 is inserted into the vinyl as at 143 (FIG. 19). When the die is raised, the memory characteristics of the vinyl 101 causes the slit formed by the die edge to grip and hold the film.

Figure 20:
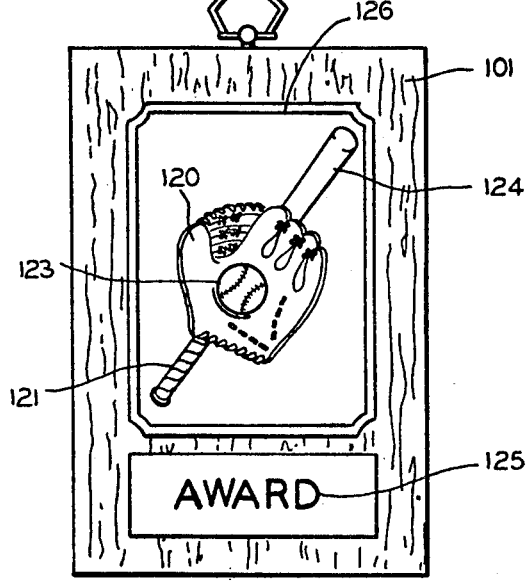
FIG. 20 is a plan view of a finished plaque made by the inventive process.

The selvage is then peeled off the plaque and the plaque is complete (FIG. 20). Any decorative hardware may be added, such as a hanger loop 145. Other hardware might include metal corners, frames, screws, rivets, or the like. An easel stand may be added to the back of the plaque.

Figure 18:
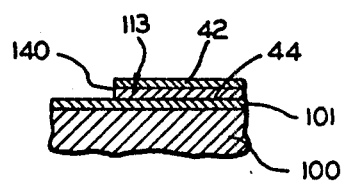
FIG. 18 is a fragmentary sectional view of the edge of a plaque cut by a conventional process.

A preferred production line would include a conveyor with a sequential plurality of work stations, each performing one of the steps shown in FIGS. 9–20. The order of some of the steps may be changed for desired effects. For example, the order of the successive hot stamping processes of FIGS. 14 and 15 depends almost entirely upon the desired end product appearance. On the other hand, when the hot stamping involves debossing, the underlying plastic 44 is extruded and surplus material must flow someplace. Therefore, there may be an extrusion of layer 44 at an edge of the film 42, such as 140 (FIG. 18). If the edge of layer 44 is rounded and confined by film 42 before debossment, the plastic in layer 44 might not extrude freely, and less than desired results might follow. Therefore, if used, it is important that the die-cutting step of FIG. 17 should follow the debossing steps.

It is to be understood that the embodiments of the invention which have been described are merely illustrative of the application of the principles of the invention. Numerous modifications may be made by those skilled in the art; therefore, the claims are to be construed to include all equivalent structures falling within the true spirit and scope of the invention.

I claim:

1. A plastic material comprising a laminated structure forming a plate having a metal-like appearance, said structure having a substrate layer of material which does not distort under hot stamping pressures and temperatures, a second layer of thermoplastic material having a predetermined thickness superimposed over said substrate, said thermoplastic material flowing under the heat and pressure of a hot stamping die, whereby the depth of the hot stamping debossment is limited to the predetermined thickness of said thermoplastic layer, and a film of non-heat-spreading material covering the surface of said thermoplastic material which is opposite said substrate, said film following and containing the flow of said thermoplastic material under hot stamping heat and pressure.

2. The material of claim 1 wherein said substrate is a polyester material having a thickness of at least approximately 0.005 inches.

3. The material of claim 2 wherein said thermoplastic layer has a thickness of approximately 0.004 inches.

4. The material of claim 3, wherein said film is a polyester material having a thickness of approximately 0.001 inches.

5. The material of claim 4 and a colored coating layer over said film.

6. The material of claim 1 wherein said thermoplastic layer has a thickness of approximately 0.004 inches.

7. The material of claim 6, wherein said film is a polyester material having a thickness of approximately 0.001 inches.

8. The material of claim 1 wherein said substrate is a sheet of metal.

9. The material of claim 1 wherein said substrate is a sheet of metal stock.

10. The material of claim 1 wherein said substrate is a sheet of metal stock of the type used for making the walls of beverage cans.

11. A process for making a debossable plastic material, said process comprising the steps of:
   a. forming a substrate from a material which does not deboss under heat and pressure;
   b. forming a layer of thermoplastic material of limited thickness integrally with and over the surface of said substrate, whereby debossment under heat and pressure is only possible in said layer of limited thickness; and
   c. forming integrally with and over the surface of said thermoplastic material a heat-resisting film which does not spread said heat, said film having a thickness which follows and confines said debossment.

12. The process of claim 11 wherein said limited thickness causes a rim of thermoplastic material to rise around the perimeter of said debossment.

13. The process of claim 12 wherein said heat-resisting film is a polyester film having a metallized surface, whereby the surface of said debossable material has a metallic appearance.

* * * * *

UNITED STATES PATENT AND TRADEMARK OFFICE
CERTIFICATE OF CORRECTION

PATENT NO. : 4,267,224
DATED : May 12, 1981
INVENTOR(S) : James C. Kanzelberger

It is certified that error appears in the above-identified patent and that said Letters Patent are hereby corrected as shown below:

In the specification:

Column 1, line 21, at the beginning of the line, "574,414" should be --579,419--

Column 2, line 7, "farily" should be --fairly--

Column 2, line 13, "plagues" should be ---plaques--

Column 4, line 10, "72" should be --22--

Column 7, line 35, "order" should be --older--

Signed and Sealed this

Eighteenth Day of August 1981

[SEAL]

Attest:

Attesting Officer

GERALD J. MOSSINGHOFF

Commissioner of Patents and Trademarks